Jan. 26, 1937.  C. SAURER  2,069,049
SHOCK ABSORBER
Filed Oct. 14, 1933  2 Sheets-Sheet 1
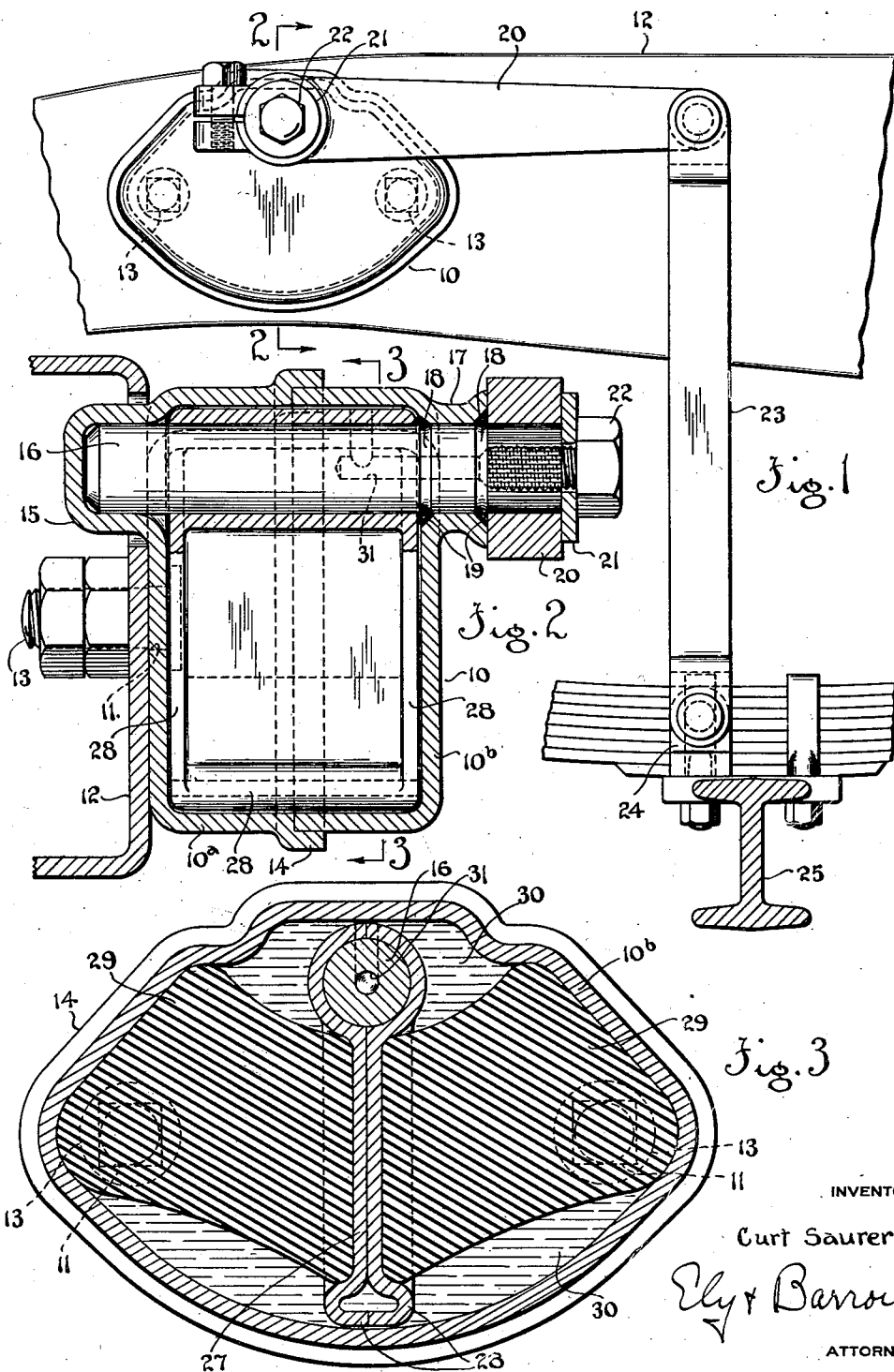
INVENTOR
Curt Saurer
Ely & Barrow
ATTORNEYS Jan. 26, 1937. C. SAURER 2,069,049
SHOCK ABSORBER
Filed Oct. 14, 1933 2 Sheets-Sheet 2
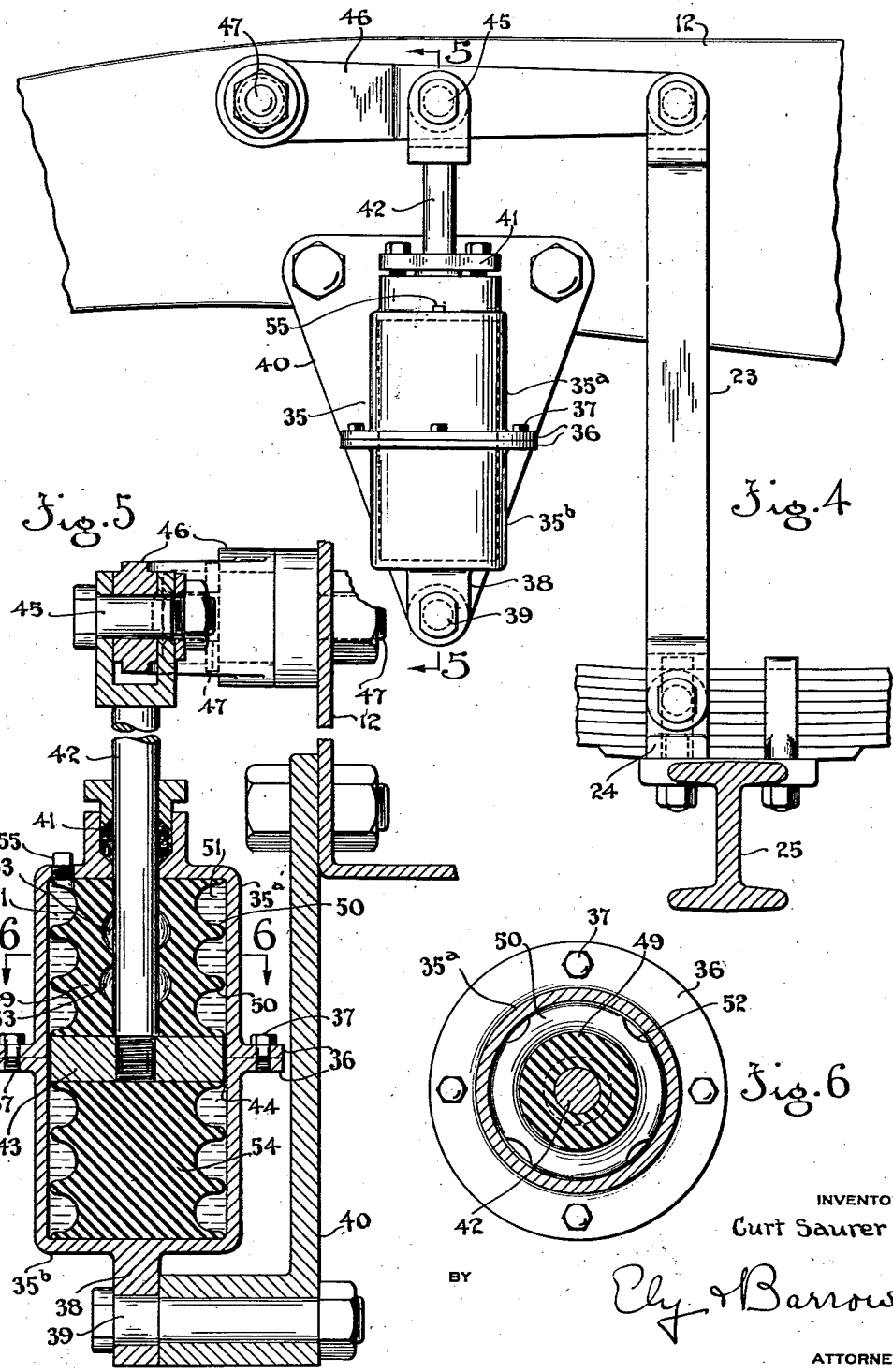
INVENTOR
Curt Saurer
BY
Ely & Barrow
ATTORNEYS Patented Jan. 26, 1937

2,069,049

UNITED STATES PATENT OFFICE 2,069,049

SHOCK ABSORBER

Curt Saurer, Akron, Ohio, assignor to The Firestone Tire & Rubber Company, Akron, Ohio, a corporation of Ohio Application October 14, 1933, Serial No. 693,632

7 Claims. (Cl. 267—21)

This invention relates to so-called shock absorbers or vibration dampers such as are used, for example, on motor vehicles, and more especially it relates to shock absorbing devices employing both mechanical and hydraulic means for cushioning and abating the bound and rebound of the vehicle.

The chief objects of the invention are to check the bound and rebound of a vehicle with the same smoothness of operation; to provide the security and positive action of a mechanical shock absorber with the smoothness of operation of a hydraulic shock absorber; to provide, in a shock absorber improved means for cushioning the initial impact; and to provide a combination mechanical and hydraulic shock absorber wherein one of the shock absorbing elements cooperates with the other element in cushioning and damping shocks and vibration.

Of the accompanying drawings:

Figure 1 is an elevation of one embodiment of the invention in its application to a motor vehicle;

Figure 2 is a section on the line 2—2 of Figure 1;

Figure 3 is a section on the line 3—3 of Figure 2;

Figure 4 is an elevation of another embodiment of the invention applied to a motor vehicle;

Figure 5 is a section on the line 5—5 of Figure 4; and

Figure 6 is a section on the line 6—6 of Figure 5.

Referring to Figures 1 to 3 of the drawings, the improved shock absorber, generally designated 10, comprises a housing composed of two mating, metallic shells of which the rear shell 10a is formed with suitable square bolt holes 11, 11 by which the structure may be mounted, as on the vehicle frame 12, by means of respective square-shouldered bolts 13, the heads of the latter being disposed interiorly of the housing. The margin of the shell 10a is formed with an offset flange 14 that is telescoped with the marginal portion of the front shell 10b of the housing, said shells being permanently joined together as by welding to effect a fluid-tight juncture. In plan the housing is of general sector shape, having an arcuate lateral face that is concentric about an axis that is disposed within the housing structure.

At said axis the rear shell 10a is formed with an outwardly extending, cup-shaped formation 15 that constitutes a journal bearing for one end of a shaft 16 that is disposed interiorly of the housing. The said shaft extends through a suitable axial aperture in the front shell 10b, which aperture is formed with an annular flange 17 constituting a journal bearing for the front end of said shaft, the latter being peripherally grooved at two points 18, 18 to accommodate suitable packing 19. Clamped upon the front end of the shaft 16, exteriorly of the housing 10, is a lever arm 20, said lever arm being restrained against axial displacement by a washer 21, and a bolt 22 that is threaded into the outer end of said shaft. The free end of lever arm 20 is pivotally connected to one end of a link 23 that is pivotally connected at its other end to a fixture or bracket 24 that is mounted upon a spring-pad of a vehicle axle 25. The arrangement is such that relative movement of the vehicle frame 12 and axle 25, due to bound or rebound, will be transmitted through the link 23 and lever arm 20 to the shaft 16 to cause angular movement or rocking of the latter.

Permanently fixed upon the shaft 16, within the housing 10, is a radial vane or piston 27 that is of general rectangular shape and has its margins slightly spaced from the housing wall at all points. The front, rear, and free marginal portions of the piston 27 are formed with respective flanges 28 that project laterally on both sides of the piston. In the normal position of the device the piston 27 is disposed vertically, midway between the opposite sidewalls of the housing, as is most clearly shown in Figure 3.

Mounted within the housing 10, in snug engagement with the opposite lateral faces of the piston 27 and the respective end walls of the housing, are respective shock absorbing bodies or cushions 29, 29 of resilient rubber composition. The said cushions are so arranged as to be subjected to compressive force alternatively as the piston 27 is oscillated one way or the other by rocking of the shaft 16, which force they yieldingly resist. The thickness of the cushions 29 is such that they are spaced from the front and rear walls of the housing, the flanges 28 on the piston 27 serving to keep them in proper position. The top and bottom faces of the cushions preferably are somewhat concave as shown, the arrangement being such as to provide space for the displacement of the rubber of the cushions, within the housing, when said cushions are placed under pressure.

The space within the housing 10 not otherwise occupied by the piston and cushions is filled with fluid 30 that preferably is non-freezing and non-corrosive so as not deleteriously to affect the metal or rubber. Such a fluid may be a glycerin composition. The fluid is introduced into the housing after assembly through a duct 31 formed in the shaft 16, the bolt 22 being threaded into the outer end of the duct to provide a closure for the same.

In the operation of the device, oscillating movement of the piston in either direction is yieldingly resisted by the fluid and by the cushions. The space between the margins of the piston 27 and the housing wall is so small that the fluid passes to the opposite side of the piston in a small stream whereby the movement of the piston is retarded. This action is immediate upon any movement of the piston and serves to cushion the initial shock of bound or rebound of the vehicle, before either cushion 29 is appreciably deformed. The cushions supplement the retarding action of the fluid, and, because of their progressively increasing resistance to deformation, serve to slow down and ultimately to limit the movement of the piston. The displacement of the rubber of cushions 29 when under pressure also serves to increase the pressure of the fluid on that side of the piston whereby the retarding ability of the fluid is amplified. The presence of the fluid in a shock absorber employing rubber as a cushioning means is advantageous in that the resistance of the fluid serves as a check against the expansive force of the deformed cushion, with the result that rebound is retarded and largely checked before the piston moves past center into engagement with the other cushion.

Referring now to Figures 4 to 6 of the drawings, there is shown therein an embodiment of the invention that operates on the same principles as the device hereinbefore described, but is of somewhat modified construction. The modified structure comprises a hollow, cylindrical housing 35 consisting of an upper shell 35a and a lower shell 35b, said shells being substantially of the same size and formed with respective marginal flanges 36, 36 whereby they may be joined together in a fluid-tight seam as by the use of bolts 37, 37.

The end wall of lower shell 35b is exteriorly formed with an apertured lug 38 by which the housing is pivotally mounted upon a shouldered bolt 39 carried by a bracket 40 that is mounted upon the frame member 12 of a vehicle. The upper shell 35 has its end wall axially apertured and provided with a stuffing box 41 for the piston rod 42 of a piston 43 within the housing, the diameter of the piston being somewhat smaller than the inside diameter of the housing to provide a narrow annular passage 44 about said piston. At its outer end the piston rod 42 is pivotally connected at an intermediate point 45 to a lever arm 46 that is pivotally mounted at 47 on the vehicle frame 12, the free end of said lever arm being pivotally connected to one end of a link 23 that has its other end pivotally connected to a fixture or bracket 24 mounted upon the spring pad of the axle 25 of the vehicle.

The arrangement is such that relative movement of the vehicle frame 12 and axle 25 will be transmitted through the link 23, lever arm 46, and piston rod 42 to the piston 43 to cause axial movement of the latter in its housing. Normally the piston is centrally positioned within the housing as is shown in Figure 5.

Mounted upon the piston rod 42 and extending from the top of the piston 43 to the upper end wall of the housing is a shock absorbing body or cushion 49 of resilient rubber composition. The periphery of the cushion 49 is formed with a series of spaced circumferential ribs 50, 50 that define intervening channels 51, 51, the outer margins of the said ribs being spaced slightly from the inner face of the housing. Each of the ribs 50 is formed with a plurality of marginal notches or re-entrants 52, Figure 6, for a purpose presently to be described.

Interiorly the cushion 49 is formed with annular recesses or hollows 53, 53 about the central aperture through which the piston rod 42 extends. Below the piston 43 is a cushion 54 that is similar in all respects to cushion 49 except that it has no axial aperture and the recesses 53 are omitted, said cushion 54 resting upon the bottom of the housing and abutting the bottom of the piston. The arrangement is such that the cushions 49, 54 are substantially of equal resilience and exert a substantially equal resistance to deformation through axial movement of the piston. Space within the housing not occupied by the piston and cushions is filled with fluid, such as glycerin composition, that is admitted to the housing through a port 55 in the top thereof.

The cushions 49, 54 and the fluid in the housing 35 supplement each other in resisting axial movement of the piston 43, and the deformation of said cushions modifies the normal action of the fluid in the same manner as in the other embodiment of the invention, whereby the shock absorbing character of the device is improved and the other objects set out in the foregoing statement of objects are achieved.

The invention may be otherwise modified without departing from the spirit of the invention or the scope of the appended claims.

What is claimed is:

1. In a device of the character described, the combination of a closed housing, a shaft journaled in said housing, an oscillating piston on said shaft having its margins spaced from the wall of the housing, blocks of resilient rubber engaging the respective lateral faces of the piston and opposite walls of the housing and spaced from the other walls thereof, and a body of fluid occupying the remainder of the space within the housing.

2. In a device of the character described, the combination of a closed housing, a rock shaft journaled therein, an oscillating piston on said rock shaft having its margins slightly spaced from the wall of the housing, and formed with oppositely extending marginal flanges, blocks of resilient rubber on opposite sides of the piston engaging the latter within said flanges and bearing against the opposite walls of the housing, and a body of fluid occupying the remainder of the space within the housing.

3. In a device of the character described, the combination of a closed housing, a rock shaft journaled therein, an oscillating piston on said rock shaft having its margins spaced from the wall of the housing, blocks of resilient rubber engaging the respective lateral faces of the piston and opposite walls of the housing, a body of fluid occupying the remainder of the space within the housing, and means for passing fluid through the rock shaft and into the housing.

4. In a device of the character described, the combination of a closed cylindrical housing, a reciprocable axial piston rod extending thereinto, a piston on said piston rod spaced from the wall of the housing, respective blocks of resilient rubber engaging opposite sides of the piston and opposite end walls of the housing, said rubber blocks being formed with radial flexible flanges extending substantially to the wall of the housing, said flanges being notched, and a body of liquid occupying the remainder of the space within the housing, said flanges being forced into yieldable sealing engagement with the wall of the housing by reason of the transverse expansion of the rubber blocks as the latter are alternately compressed by the piston.

5. In a shock absorber, the combination of a closed housing, a piston therein mounted intermediate the ends of said housing and slightly spaced from the side walls thereof, said piston being movable within said housing, a liquid disposed in said housing at opposite sides of said piston, and a rubber member disposed in said housing on each side of said piston, each of said rubber members having a portion of less cross-sectional area than the cross-sectional area of the housing taken on the same plane, whereby to provide a space between the wall of said rubber member and the adjacent wall of said housing, in which space said fluid is normally disposed, each of said rubber members being adapted to be deformed by movement of said piston in a direction toward one end of said housing, the rubber member on one side of said piston increasing in cross-sectional area and the rubber member on the other side of said piston decreasing in cross-sectional area to displace the liquid from said end of the housing to the other end of said housing on the other side of said piston.

6. A shock absorber comprising a closed housing, a movable piston therein, said piston being spaced from said housing, a pair of deformable rubber members disposed in said housing between said piston and the respective ends of said housing, said deformable member being so proportioned within said housing as to provide a space between the member and said housing, a liquid medium disposed within said space entirely within said housing, said piston and housing being so constructed and arranged that said member may be deformed by movement of said piston as to displace said liquid from one end of said housing past said piston to the other end of said housing as said rubber member is transversely expanded by reason of longitudinal compression thereof by the piston.

7. A shock absorber comprising a closed housing, a movable piston within said housing, and a deformable rubber member interposed between said piston and an end of the housing, said deformable rubber member being provided with alternate ribs and grooves, a liquid medium disposed within said grooves, whereby deformation of said rubber member by movement of said piston toward said end of the housing will cause displacement of the liquid medium within said grooves, said ribs constituting flexible packing rings for obstructing the flow of said liquid medium.

CURT SAURER.